United States Patent [19]

Bloom

[11] Patent Number: 4,961,128
[45] Date of Patent: Oct. 2, 1990

[54] PUSH-PULL ZERO-RIPPLE IM CONVERTER SYSTEM

[75] Inventor: Gordon E. Bloom, San Rafael, Calif.

[73] Assignee: Zenith Electronics Corporation, Glenview, Ill.

[21] Appl. No.: 291,174

[22] Filed: Dec. 28, 1988

[51] Int. Cl.$^5$ .......................................... H02M 3/335
[52] U.S. Cl. .......................................... 363/16; 363/24
[58] Field of Search .................. 363/16, 17, 24, 25, 363/26, 97, 98, 133, 134; 323/266

[56] References Cited

U.S. PATENT DOCUMENTS

| | | | |
|---|---|---|---|
| 3,553,620 | 1/1971 | Cielo et al. | 363/25 X |
| 3,694,726 | 9/1972 | Cielo et al. | 363/25 |
| 4,184,197 | 1/1980 | Cuk et al. | 363/16 |
| 4,257,087 | 3/1981 | Cuk | 363/16 |
| 4,262,328 | 4/1981 | Bloom et al. | 363/16 |
| 4,355,352 | 10/1982 | Bloom et al. | 363/39 X |
| 4,561,046 | 12/1985 | Kuster | 363/21 |
| 4,675,796 | 6/1987 | Gautherin et al. | 363/24 X |
| 4,675,797 | 6/1987 | Vinciarelli | 363/19 X |
| 4,688,160 | 8/1987 | Fraidlin | 363/21 |
| 4,737,899 | 4/1988 | Lorec | 363/24 |
| 4,754,387 | 6/1988 | Konopka | 363/49 |
| 4,783,795 | 11/1988 | Yahata | 363/24 X |

OTHER PUBLICATIONS

Hoffman, Jr., IBM Technical Disclosure, "Switching Regulator Having Ripple Compensation by Current Insertion in Transformer Primary", 2/76, pp. 2927-2928.

*Primary Examiner*—Steven L. Stephan
*Assistant Examiner*—Kristine Peckman

[57] ABSTRACT

A unique multi-output isolated buck DC-DC converter system is disclosed. The converter system has non-pulsating input and output current waveforms. The converter can be adapted to two- or three-bobbin integrated-magnetic embodiments, or in discrete-magnetic form. One embodiment of the converter comprises capacitor means joined at one end to a first common core inductor and joined at its opposite end to a second common core inductor; and switch means having a duty cycle, for alternately joining an output lead to one end of the capacitor means and to the opposite end of the capacitor means, such that a voltage proportional to "VD" is produced at the output lead when a DC voltage "V" is applied across opposite ends of the first and the second common core inductor.

13 Claims, 8 Drawing Sheets

N1>N2

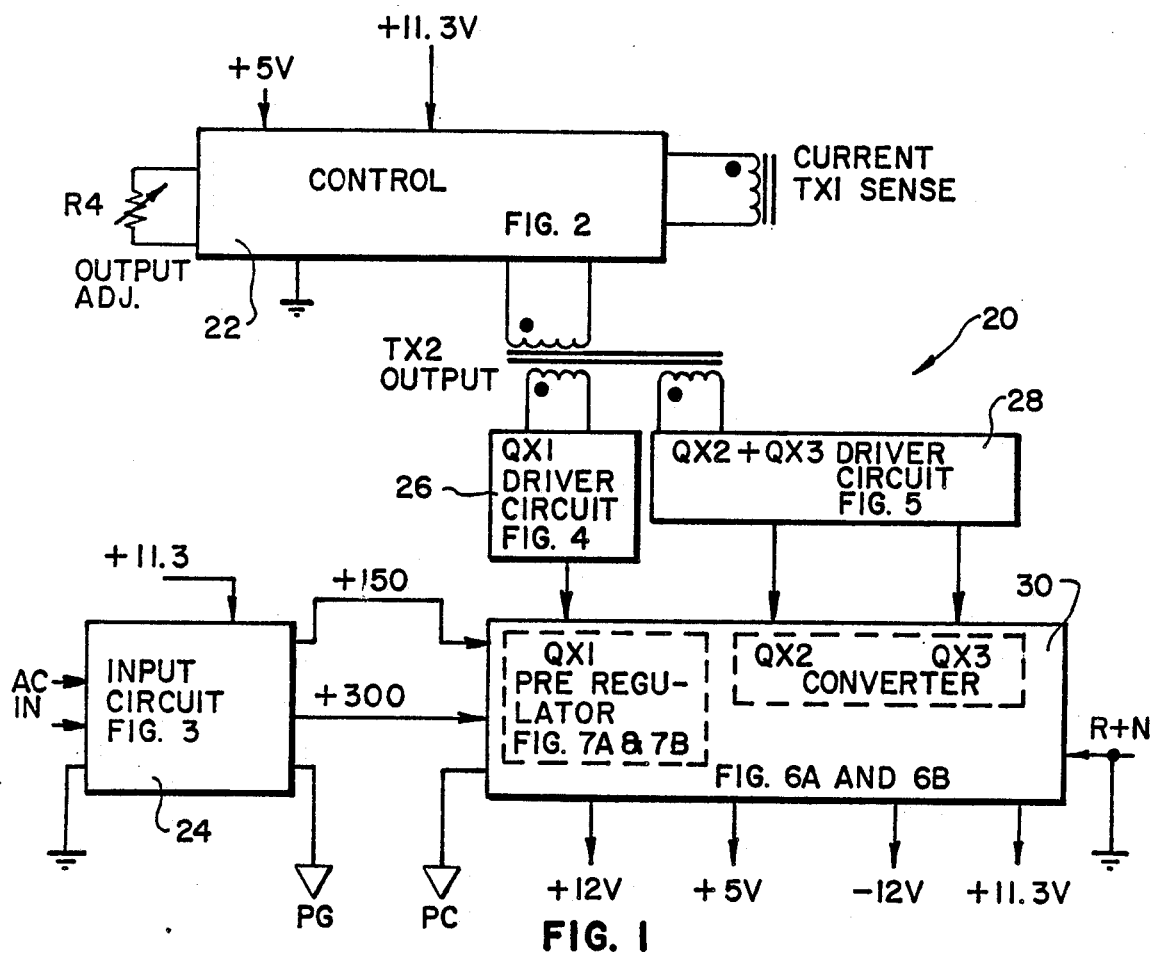
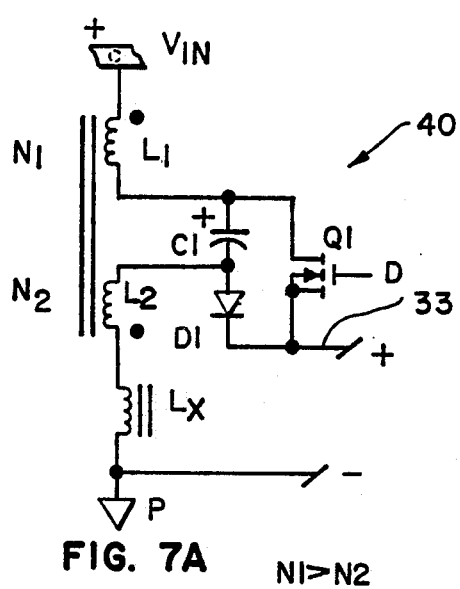
FIG. 7A    N1 > N2
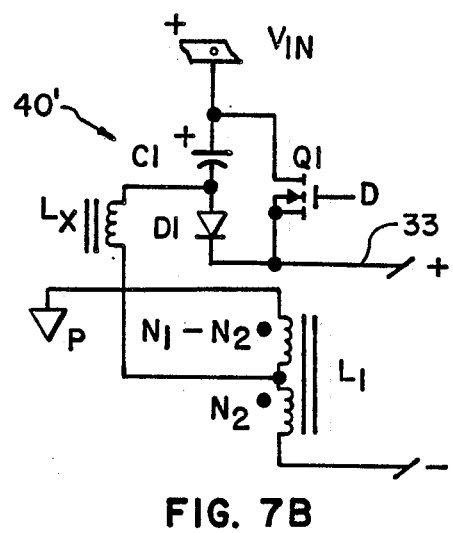
FIG. 7B

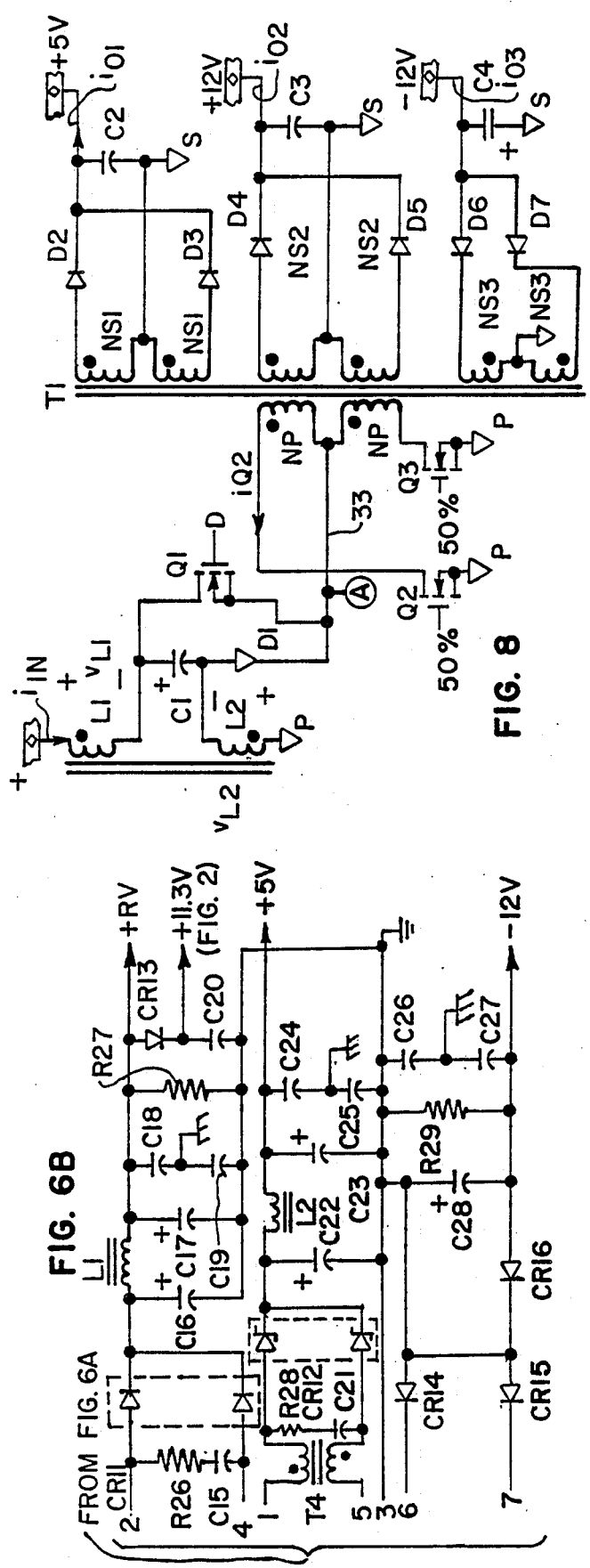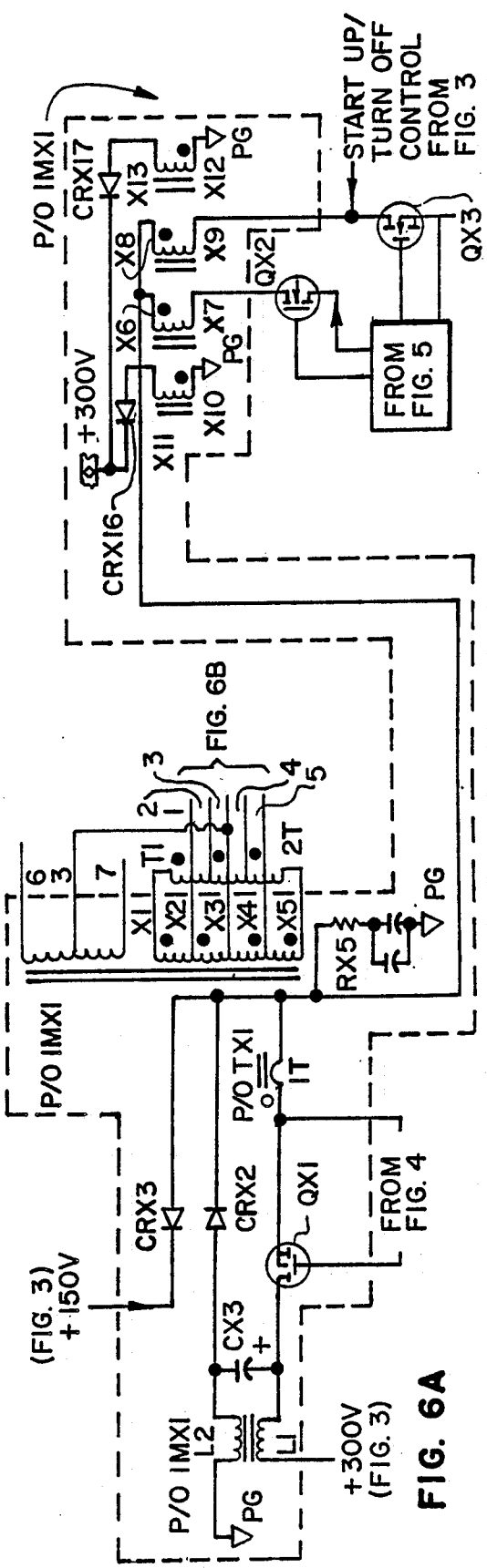

PUSH-PULL ZERO-RIPPLE IM CONVERTER SYSTEM

TECHNICAL FIELD

This invention relates to the general subject of power supplies and, in particular, to the subject of converters and switch mode power supplies of the type using integrated magnetics.

BACKGROUND OF THE INVENTION

A continuing goal of electrical engineers has been the goal of reducing the physical size and parts count of switchmode power converters. The blending together or combining of inductors and transformers into single physical assemblies with little or no compromise in the desired conversion characteristics has been termed "integrated magnetics". One important reason for this effort has been the fact that inductors and transformers are major contributors to the total cost, weight and size of a converter system. Magnetic integration, if properly executed in the design of power converters, can bring added benefits in electrical performance, such as reduced stress on the components.

An excellent overview of the state of the art is presented in Chapter 12 of the book "*Modern DC-to-DC Switchmode Power Converter Circuits*," by Rudolf P. Severns and Gordon E. Bloom, van Nostrand Reinhold Company, 1985. A comprehensive background of the subject is contained in the two volume book "*Modern DC-to-DC Switched-Mode Power Conversion*," by R. D. Middlebrook and Slobodan Cuk; TESLAco, Pasadena, Calif. (1983). Some U.S. patents on the subject of integrated magnetics and converters are:

U.S. Pat. Nos. 4,675,797 4,675,796 4,538,219 4,257,087 3,694,726 4,688,160 4,561,046 4,355,352 4,262,328 3,553,620

The process of magnetic integration is not simple. For the most part, integrating magnetic elements of a converter does not add to the many design aspects and difficulties with which an engineer must contend during the converter's development phase. However, it does place additional burden on the designer to properly specify the performance of the integrated magnetic elements and a burden on the manufacturer to insure a consistent product which can be more complex than a simple transformer or inductor assembly. For example, there are some subtle electrical problems which arise when coupling inductors together on a common magnetic core. Imbalances in the required turns ratio relationships between the inductor and transformer winding can produce circulating currents in filter networks, resulting in excessive ripple current. High power loss in filter capacitors can result in converter damage and even destruction of the filter elements. Thus, integrated magnetics, as applied to switchmode power converter circuits, is a concept which is not straight-forward or easy to apply in practice.

Any advancement that can be made and any teaching in this highly complex subject area will be welcome by those skilled in the art, and any practical embodiment of these teachings will advance the state of the art. This is particularly true if subtle design considerations are highlighted and circuits are presented which result in unexpected improved performance or operating characteristics, especially when only a few basic components are used to create a product which can be produced in quantity at a competitive price.

OBJECTS OF THE INVENTION

Accordingly, it is a basic object of the invention to disclose several unique integrated magnetic switch-mode power converter circuits and systems.

Another object of the invention is to disclose an off-line converter system design, employing a novel buck type converter cascaded with a constant duty cycle DC/DC converter.

It is yet another object of the invention to disclose converter system designs adaptable to integration of magnetics using two-bobbin or three-bobbin core structures.

Still another object of the invention is to disclose a non-obvious pre-regulator which produces substantially non-pulsating output using coupled inductors, a capacitor, and switching means.

It is also an object of the invention to disclose a new front-end circuit for a converter system.

Many other advantages and features of the present invention will become readily apparent from the following detailed description of the invention, the embodiments described therein, from the claims, and from the accompanying drawings.

BRIEF DESCRIPTION OF THE DRAWINGS

FIG. 1 is a block diagram of a power supply incorporating the converter system that is the subject of the present invention;

FIGS. 6A and 6B are electrical schematic diagrams of the pre-regulator, constant duty cycle DC converter and secondary of the power supply of FIG. 1;

FIGS. 7A and 7B are electrical schematic diagrams of two discrete-magnetic embodiments of the pre-regulator that is the subject of the present invention;

FIG. 8 is an elementary electrical schematic diagram of the pre-regulator of FIG. 7A and a constant duty cycle DC/DC converter, both circuits in discrete-magnetic form, that are the subjects of the present invention;

DETAILED DESCRIPTION OF THE PREFERRED EMBODIMENT

Figure 3:
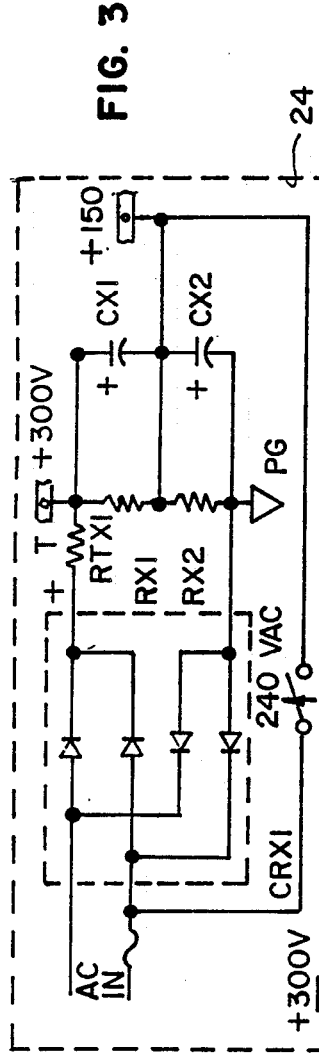
FIG. 3 is an electrical schematic diagram of the input circuit of the power supply of FIG. 1.

While this invention is susceptible of embodiment in many different forms, there is shown in the drawings and will herein be described in detail several specific embodiments of the invention. It should be understood, however, that the present disclosure is to be considered as an exemplification of the principles of the invention and is not intended to limit the invention to the specific embodiments illustrated.

Referring to FIG. 1, there is illustrated a block diagram of a power supply 20 comprising a control circuit 22, an input circuit 24, a pre-regulator driver circuit 26, a converter driver circuit 28, and an output circuit 30. The output of the control circuit 22 is linked to the preregulator driver circuit 26 and the converter driver circuit 28 by means of a transformer TX2. AC voltage applied to the input circuit 24 is converted by the output circuit 30 to +12 V, +5 V, +11.3 V, and −12 V DC. Individual elements and circuitry of FIG. 1 will now be explained. Afterwards, some of the more unique circuits will be described in greater detail.

"Control Circuit"

Figure 2:
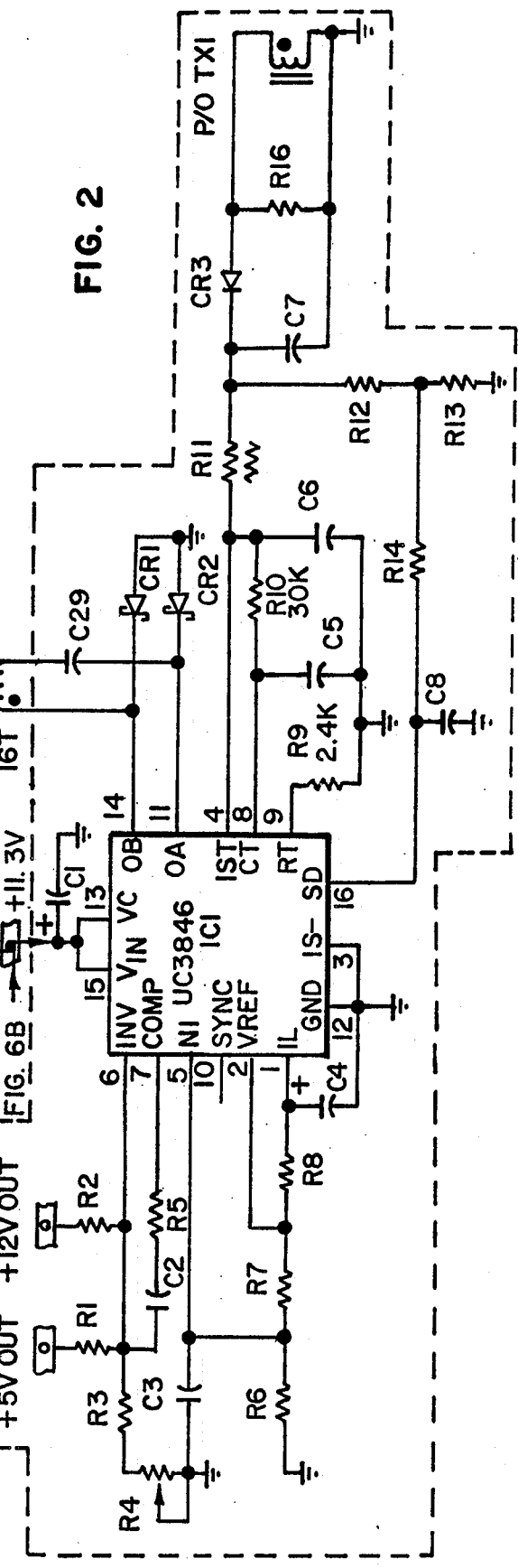
FIG. 2 is an electrical schematic diagram of the control circuit of the power supply of FIG. 1.

Turning to FIG. 2, IC1 is the main drive control element of power supply 20 for regulation of output voltages. Pulse width modulation is performed by the UC3846 element.

R1 is used in conjunction with R2, R3, and R4 to form a proper voltage level for IC1 for feedback control of the +5 V and +12 V output potentials of the power supply. R4 allows the user to adjust output voltages within desired ranges during power supply tests. R6 is used with R7 to develop a 2.5 V reference voltage level for pin 5 of IC1. C3 is used as a noise de-coupling element for pin 5 of IC1. R8 is used with C4 for a soft-start function of the power supply when AC power is first supplied. The value of R8 is set low enough to cause complete shutdown of IC1 via pin 1 until the +11.6 V bias power for IC1 is recycled (See pins 13, 15). C1 is used as a noise and drive power de-coupling element for pins 13 and 15 of IC1. C2, used with R5, forms a feedback compensation network for stability control of output voltage regulation, via the amplifier located within IC1.

Referring now to the right end of FIG. 2, C8 is used as noise filter capacitor for pin 16 of PWM IC1. C5 is used with R9 to set the operating frequency of IC1 at nominally 200 KHz.

Figure 5:
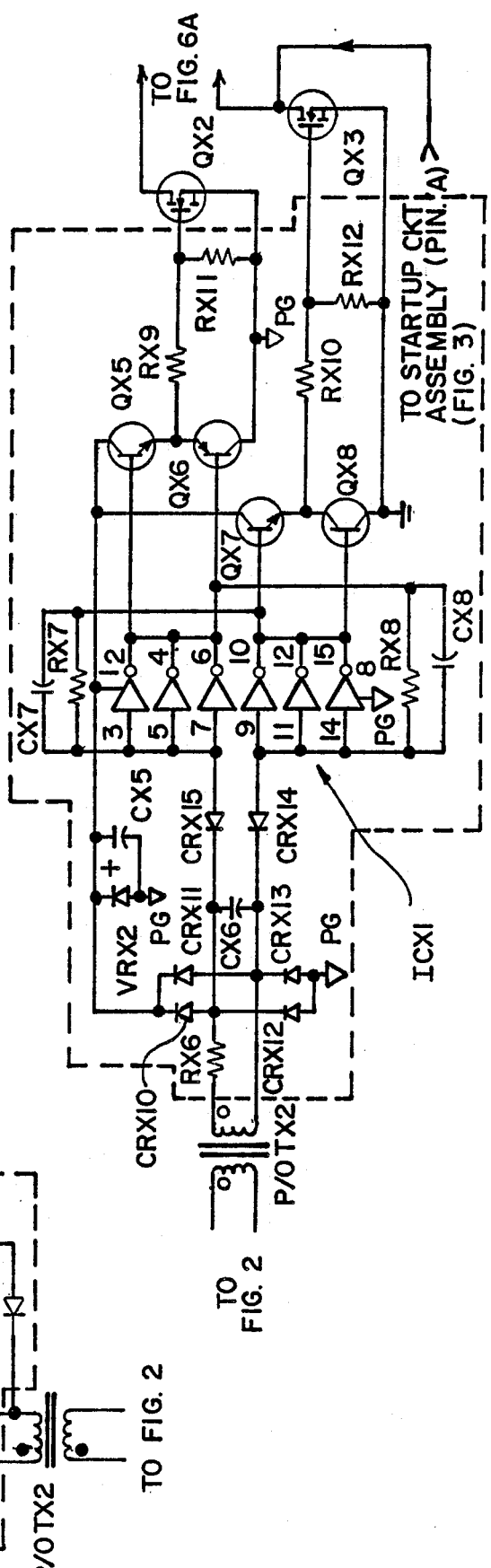
FIG. 5 is an electrical schematic diagram of the driver circuit for the constant duty cycle DC/DC converter of the power supply of FIG. 1.
Figure 9:
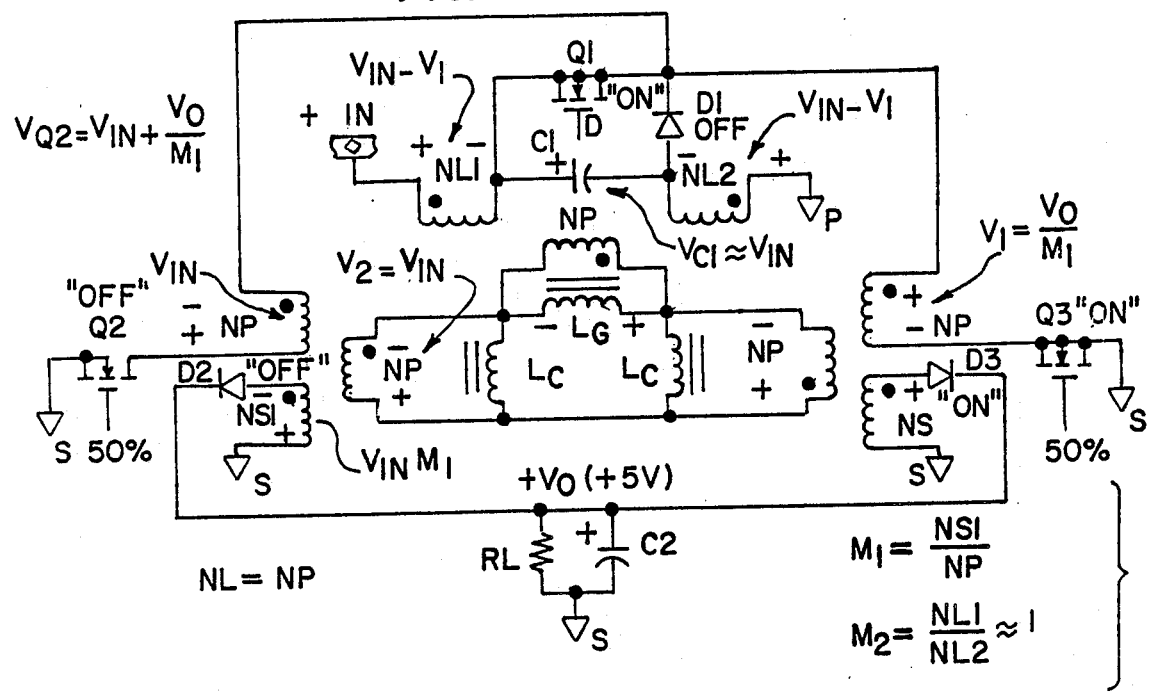
FIG. 9 through FIG. 12 are electrical schematic diagrams of the circuit of FIG. 14 in its four states.
Figure 10:
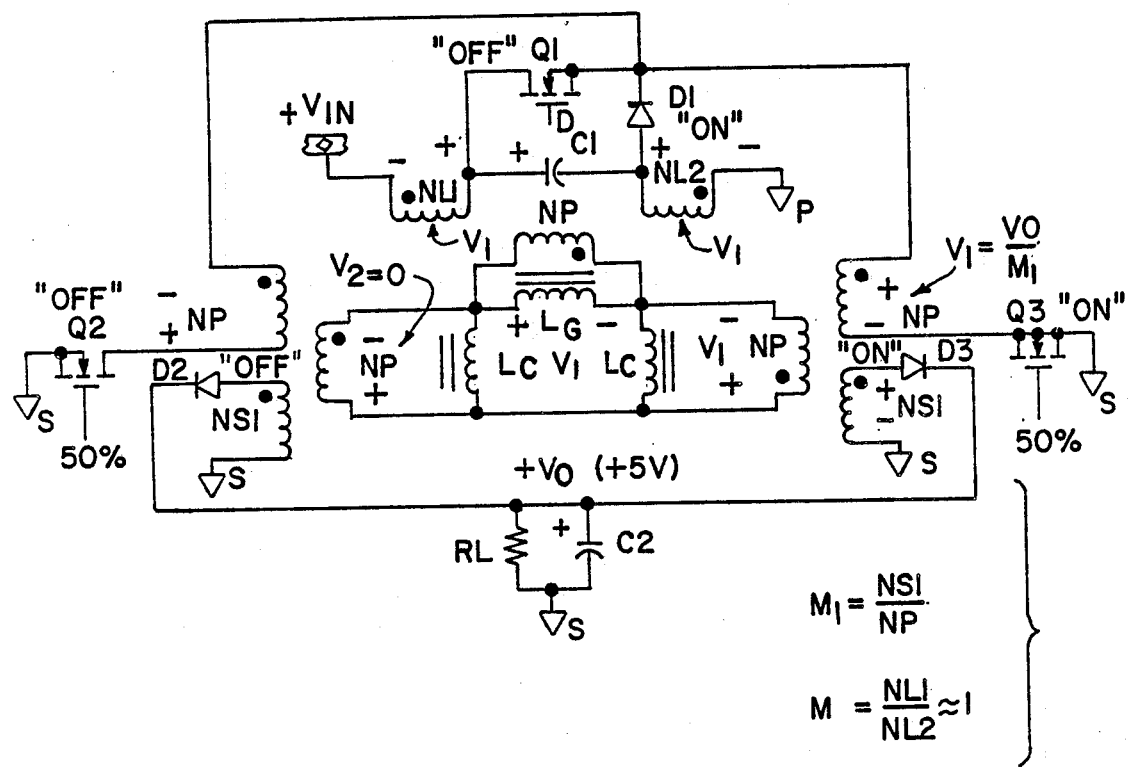
Figure 11:
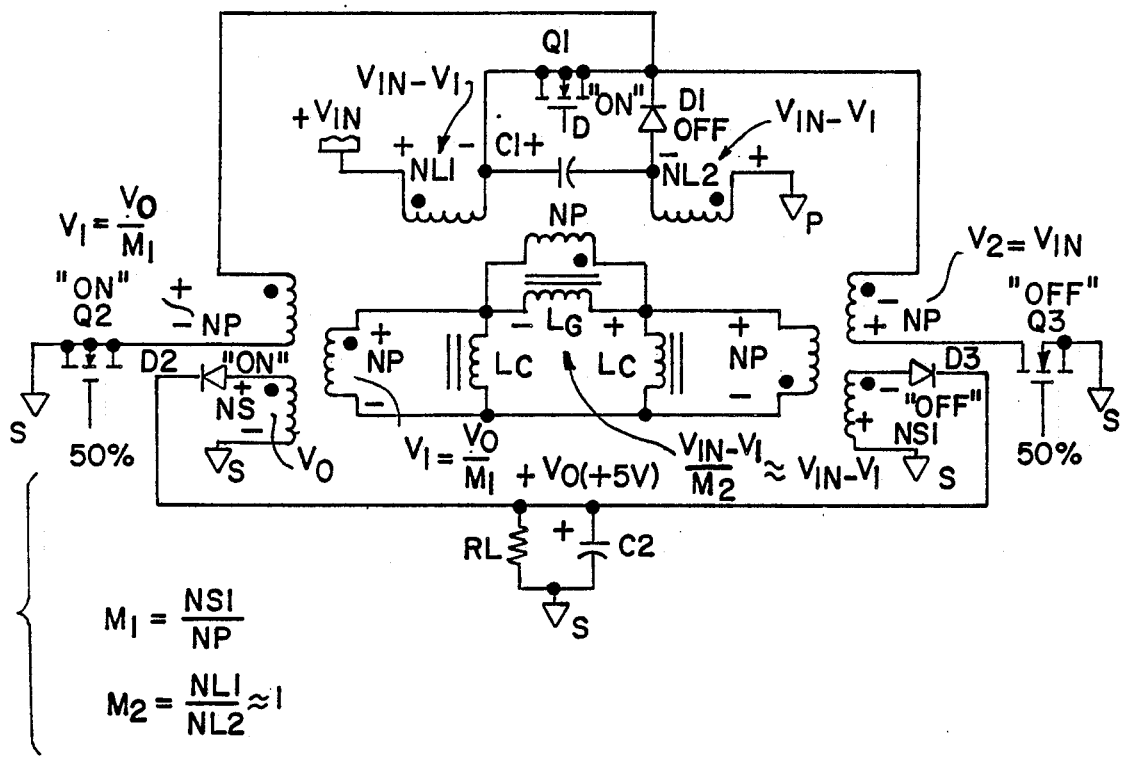
Figure 12:
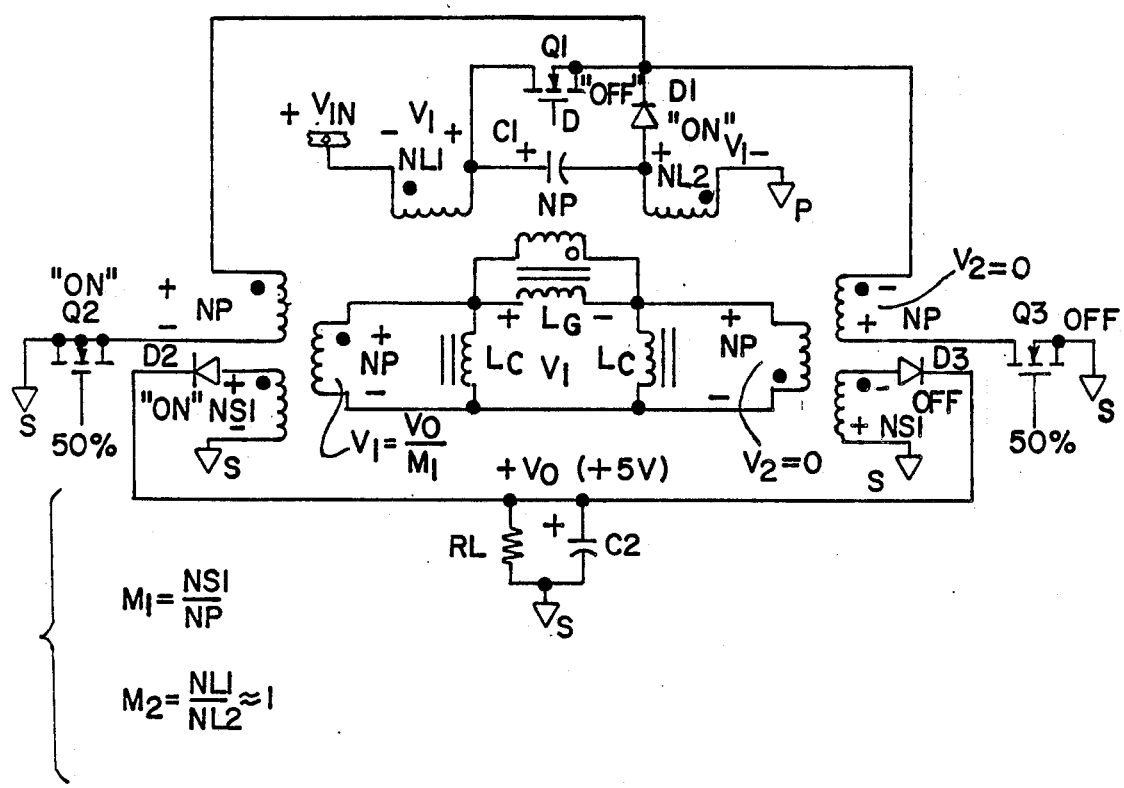

TX2 is used to provide isolated PWM drive commands from pins 11 and 14 of IC1 to QX1 in FIG. 6A and to ICX1 in FIG. 5 for 50% conduction control of QX2 and QX3. C29 is used to prevent DC offsets in the outputs of IC1 from saturating the drive transformer TX2. CR1 is used to prevent pin 14 of IC1 from exceeding −0.5 V due to inductive elements associated with TX2. CR2 is used to prevent pin 11 of IC1 from exceeding −0.5 V due to inductive effects of TX2. The outputs of IC1 at pins 11 and 14 are alternately positive and zero voltages in value.

C6 is used with R11 to form a noise filter for pin 4 of IC1. R10 provides a small sample of the frequency ramp of IC1 on top of the current sense signal to allow the converter switch QX1 to operate at greater than 50% duty cycle without control stability problems. R11 is used with R10 and R6 to develop a proper ramp voltage level for IC1, pin 4, for current-mode control of the power supply. R13 is used with R12 to develop a proper shutdown voltage level at pin 16 of IC1 in the event of an over-current fault in QX1 sensed by TX1.

TX1 is used to provide a current level sample of the dynamic current through QX1, when it is "on". This sample is then used by IC1 for current-mode regulation control of the power supply. C7 is a noise filter for secondary of TX1. CR3 is used to provide a rectified current-sense signal to IC1 from TX1 for PWM control. R16 is used to provide a core reset path for TX1 when QX1 is turned "off".

"Input Circuit"

Turning to FIG. 3, RTX1 is used for limiting peak current drawn from the AC power source (AC IN) at turn-on of the power supply 20 by the user. CRX1 is used to convert the incoming AC voltage to a high voltage DC value.

RX1 is used with RX2 to equalize voltages across CX1 and CX2. CX1 is used with CX2 to form capacitive power filter for incoming HV DC developed by CRX1. Included within the input circuit 24 is a start-up circuit 32. Such circuits are well known to those skilled in the art. The start-up circuit disclosed in U.S. Pat. No. 4,754,387 to Konopka and assigned to the assignee of the present application may be used here.

"Pre-Regulator and Driver"

Figure 4:
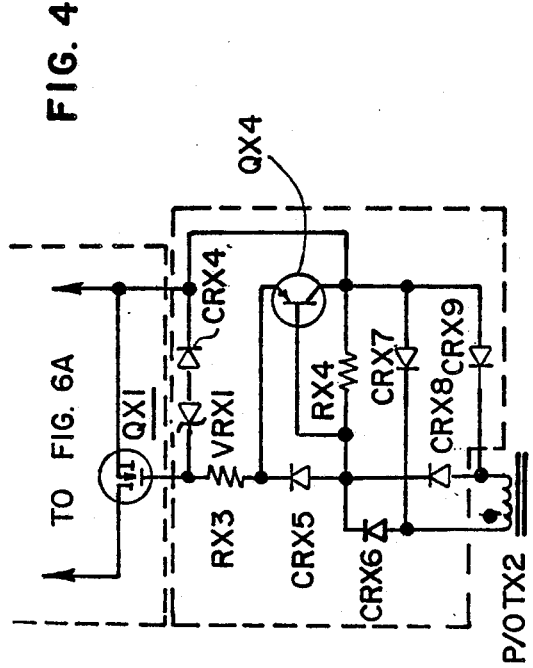
FIG. 4 is an electrical schematic diagram of the pre-regulator driver circuit portion of the power supply of FIG. 1.

Referring to FIGS. 4 and 6A, QX1 is a main pre-regulator switch element. QX4 is used as a low impedance driver for rapid turnoff of power switch QX1. CRX6 is used with CRX7 thru CRX9 to form a full wave bridge to convert bipolar drive signals from IC1 via TX2 to a unipolar PWM drive for QX1. RX3 is used to limit G-S capacitive charge/discharge currents of QX1. RX4 is a base pull down for QX4 in discharging G-S capacitance of QX1 during turnoff intervals. VRX1 and CRX4 are used to the prevent positive gate drive signal for QX1 via TX2 from exceeding safe limits at power supply turn-on. CRX4 helps to reduce total capacitance appearing across G-S of QX1 caused by VRX1.

CRX2 (See FIG. 6A) is a main commutating diode for pre-regulator portion of DC-DC converter of power supply, while CRX3 is used to clamp output of pre-regulator portion of DC-DC converter to no more than ½ of the incoming HV DC under dynamic switching conditions. CRX5 (See FIG. 5) is used to provide a direct path for positive drive signal for QX1 for rapid turn-on.

CX3 is used as a filter element within the pre-regulator portion of the DC-DC converter of the power supply. It also provides an AC path between the inductor windings of IMX1 to produce a non-pulsating input DC current waveform. CX4 is used with RX5 to form a voltage-snubber network for dynamic limiting of the output potential of the pre-regulator circuit of the power supply.

"Converter Driver"

Turning now to FIGS. 5 and 6A, ICX1 (CD 4049B) is used to form a combined latch and driver network for QX5 thru QX8. It uses the PWM drive signal from IC1 (See FIG. 2), via TX2, for setting and resetting the latch function. TX2 is used to provide isolated PWM drive commands to QX1 (See FIG. 4) and to ICX1 (See FIG. 5) for 50% conduction control of QX2 and QX3. RX7 and RX8 prevent loading of the outputs of ICX1 on incoming set/reset signals from TX2. CX7 is used with RX7 to speed up set and reset time of the latch network formed by the gates of ICX1. CX8 is used with RX8 to provide the same functions as CX7 and RX7 for the other side of the latch network.

QX2 is one of two 50% power switches of the converter. QX5 is used with QX6 to form a low impedance driver for QX2. RX9 limits charge/discharge currents for turn-on/off of QX2. RX11 prevents turn-on of QX2 from drain-to-gate (D-G) leakage currents. CRX16 (See FIG. 6A) is used in conjunction with an associated primary transformer winding of IMX1 to form a voltage clamp for QX2 when this power switch is in an off state.

QX3 is the other 50% power switch of the converter. QX7 is used with QX8 to form a low impedance driver for QX3. RX12 prevents QX3 turn-on from drain-to-gate leakage currents. RX10 limits charge/discharge currents for turn on/off of QX3.

CRX10 is used with CRX11 through CRX13 to form a full bridge network for converting the bipolar PWM drive signals from IC1, via TX2, into a unipolar power source for developing a +10 V bias referenced to power GND for ICX1, etc. CRX14 and CRX15 are each used to isolate each input of the latch circuit formed by the gates of ICX1. They also prevent a signal path, when forward-biased, for setting or resetting the ICX1 latch. Those skilled in the art will recognize that ICX1, its gates, transistors QX5 through QX8, and feedback components RX7, CX7, RX8, and CX8 function as a set-reset logic latch circuit. Functionally, such a latch has a "set" input, a "reset" input, and complementary (e.g., Q and Q') outputs.

RX6 is a drive/bias current limit component. VRX2 is used with RX6 to form a shunt voltage regulator for providing bias and drive power for ICX1, QX5, and QX7 from the isolated PWM signals of IC1 (via TX2). CX6 is used with RX6 as noise filter elements for the latch drive signals into ICX1. CX5 is used across VRX2 to provide an instantaneous source of drive power for turning on QX2 or QX3 via QX5 or QX7. CX5 also acts as a noise filter for the ICX1 power lines.

"Integrated-Magnetics"

Referring to FIG. 6A and 6B, IMX1 is three-bobbin magnetic assembly combining both inductive and transformer functions on a single ferrite E—E core arrangement. T1 is used to provide an AC step-down function for the +12 V secondaries of IMX1 to improve cross-regulation between the +5V and +12 V outputs of the power supply.

CR11 is used as a main rectifier network to derive the +12 V output of the power supply from the associated AC secondaries of IMX1. CR13 is used to isolate the +12 V output of the power supply from the source of start-up power. C15 is used with R26 as voltage snubbing network for CR11. C16 is used as a main capacitive filter element for the +12 V output of the power supply. C17 is used with L1 to form a low-pass noise filter for the +12 V output of the power supply. C18 and C19 are used for high-frequency noise reductions at the +12 V output. R27 is a bias current load for the +12 V output of the power supply. C20 is used as a filter capacitance for the +11.3 V bias and start power line used by IC1, etc.

CR12 is a main rectifier assembly used to derive the desired +5 V output for the power supply from the associated AC secondary windings of IMX1. C21 is used with R28 to form a voltage snubber network across the anode terminals of CR12. C22 is used as a main capacitive filter element for the +5 V output of the power supply. C23 is used with L2 to form a low-pass filter for the +5 V output of the power supply. C24 and C25 are for noise bypassing of the +5 V output of the power supply.

CR14 and CR15 form the −12 V DC output of the power supply from the associated AC windings of IMX1. C26 and C27 provide noise bypassing functions for the −12 V output of the power supply. C28 is the main capacitive filter for the −12 V output of the power supply. CR16 is used to provide a 0.7 V trimming voltage drop to allow −12 V output of power supply to track +12 V voltage level. R29 is a bias load for the −12 V output of the power supply.

"Pre-Regulator"

Turning to FIGS. 7A and 7B, two discrete-magnetic embodiments of the pre-regulator 40 portion of the power supply 20 are illustrated. FIG. 7A shows a pre-regulator with two tightly-coupled inductors, L1 and L2, with windings N1 and N2 placed on a common magnetic core. In FIG. 7B, the tapped inductor equivalent network of FIG. 7A is shown. If L1 and L2 are the magnetization inductances of their respective windings, N1 and N2, and if the leakage inductances between these windings are very close to zero, it can be shown that:

$$L_X = [(N1/N2) - 1][(N2/N1)^2]L1$$

or $$L_X = [(N1/N2) - 1]L2$$

where $L_X$ is chosen for zero AC current ripple in $L_1$. Note the external "turning inductor", Lx has a maximum value of 0.25L1 when N1=2N2. L1 functions to steer away the ripple voltage imposed on it. By virtue of the polarity of the diode D1, when the switch Q1 conducts, diode D1 does not conduct. Similarly, when the switch Q1 is "off", diode D1 conducts. This is the functional equivalent of a two-position switch which alternately connects the output 33 of the pre-regulator to each side of the capacitor C1.

"Operation"

FIG. 8 illustrates the pre-regulator of FIG. 7A cascaded with a constant duty cycle converter. In particular, the output 33 of the pre-converter is supplied to a transformer T1 through the center tap of a split or center tapped primary winding NP. Each end of the primary winding is joined by switches Q2 and Q3 to primary ground P.

In this discrete-magnetic embodiment, the secondary side of the transformer T1 has three center-tapped windings NS1, NS2, and NS3 which are rectified by diodes D2 and D3, D4 and D5, and D6 and D7, to produce across output capacitors C2, C3, and C4, three voltages +5 V, +12 V, and −12 V DC relative to a secondary ground S. The conversion characteristic is (NSn/NP) D, where "D" is the duty cycle of the pre-regulator switch Q1, and n=1, 2, or 3. Those skilled in the art will recognize that the discrete-magnetic circuit of FIG. 8 is functionally equivalent to that of the integrated-magnetic designs of FIGS. 6A and 6B. The circuit of FIG. 8 can be described as an isolated, multi-output buck DC-DC converter system with non-pulsating input and output current wave-forms.

Figure 14:
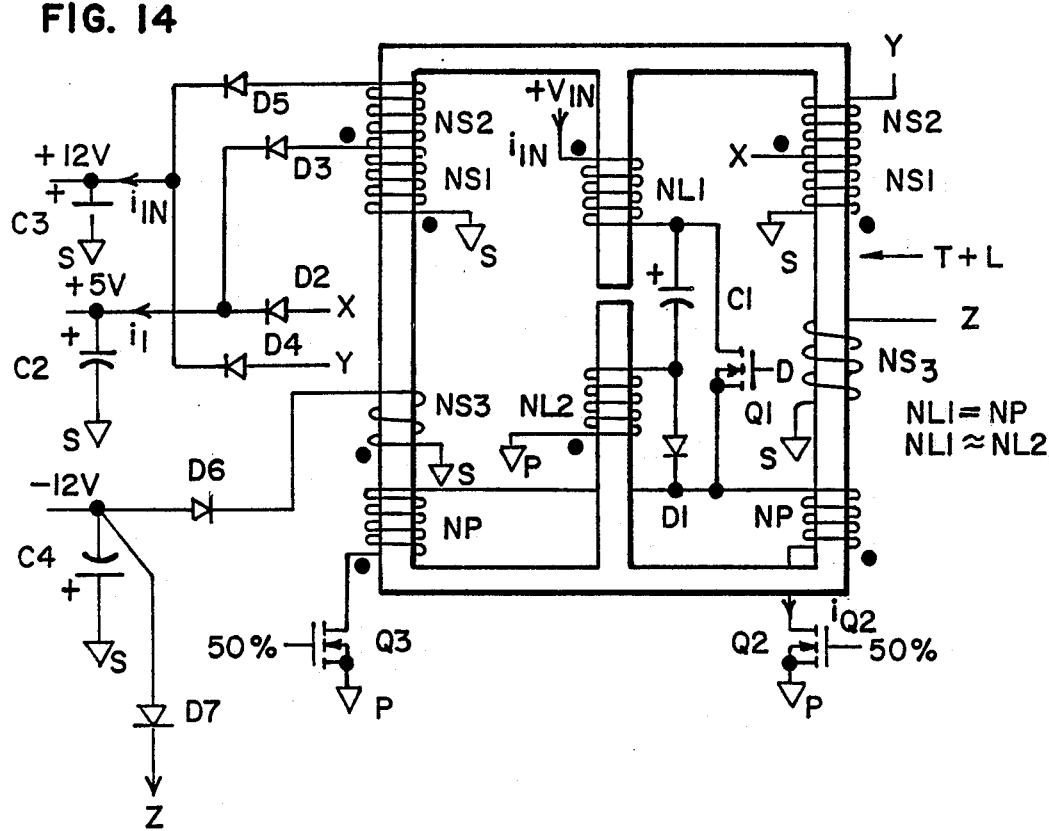
FIG. 14 is an electrical schematic diagram of a three-bobbin integrated-magnetic embodiment of the converter stage of FIG. 8.
Figure 15:
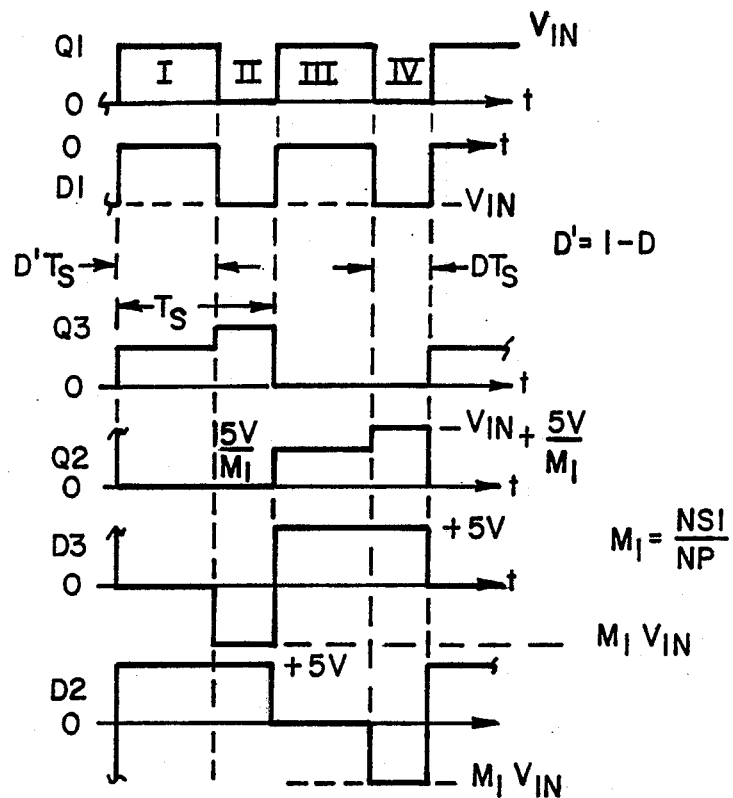
FIG. 15 is diagram illustrating the voltages across selected components of the converter stage of FIG. 14.

FIG. 14 shows a three-bobbin integrated-magnetic version of the circuits of FIG. 8. Here, the operation of the primary switches Q1, Q2, and Q3 and the diodes D1, D2, and D3 of FIG. 14 sequences through four steps or stages depicted in FIGS. 9, 10, 11, and 12. The appropriate ideal voltage waveforms for each stage is shown in FIG. 15. In the electrical circuit models of FIGS. 9, 10, 11, and 12, "$L_G$" represents the inductance of the air-gapped center core leg of the embodiment of FIG. 14, and "$L_C$" represents the inductance of either of the two outer core legs. For simplicity, the +12 V and −12 V outputs are not shown in FIGS. 9, 10, 11, or 12.

The sequence of operation of FIGS. 9, 10, 11, and 12 is summarized in the following table:

| STATE | Q1 | Q2 | Q3 |
|---|---|---|---|
| I | ON | OFF | ON |
| II | OFF | OFF | ON |
| III | ON | ON | OFF |
| IV | OFF | ON | OFF |

Figure 13:
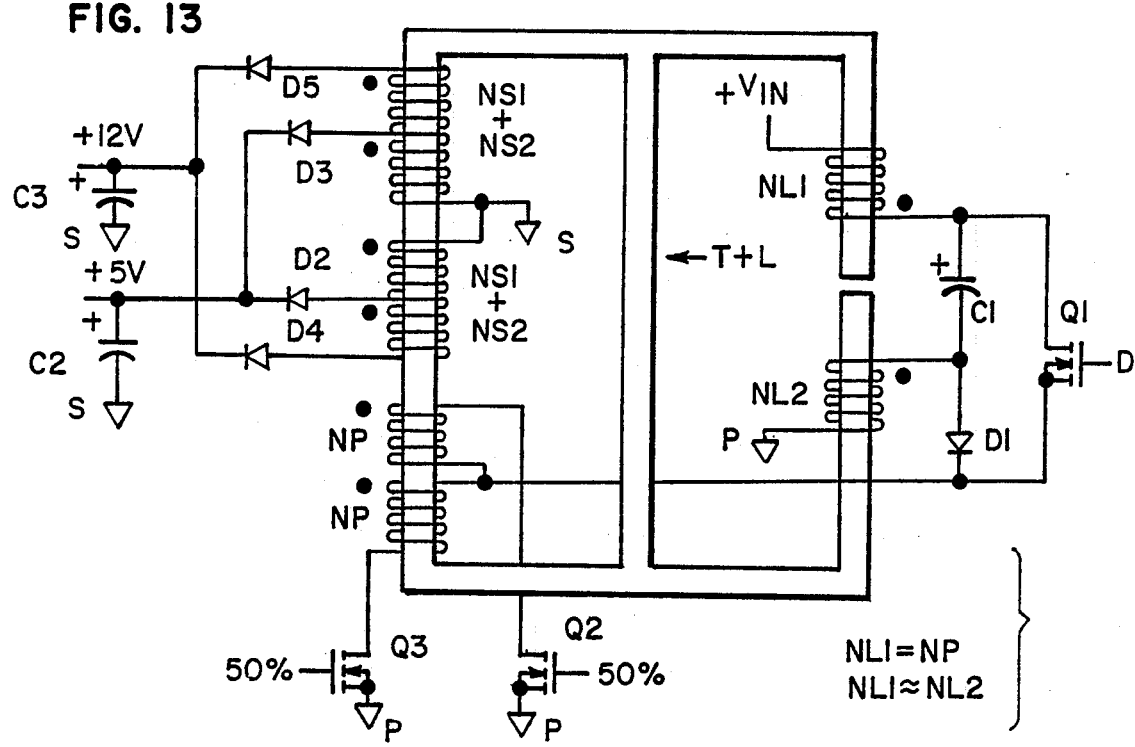
FIG. 13 is an electrical schematic diagram of a two-bobbin integrated-magnetic embodiment of the converter stage of FIG. 8.
Figure 16:
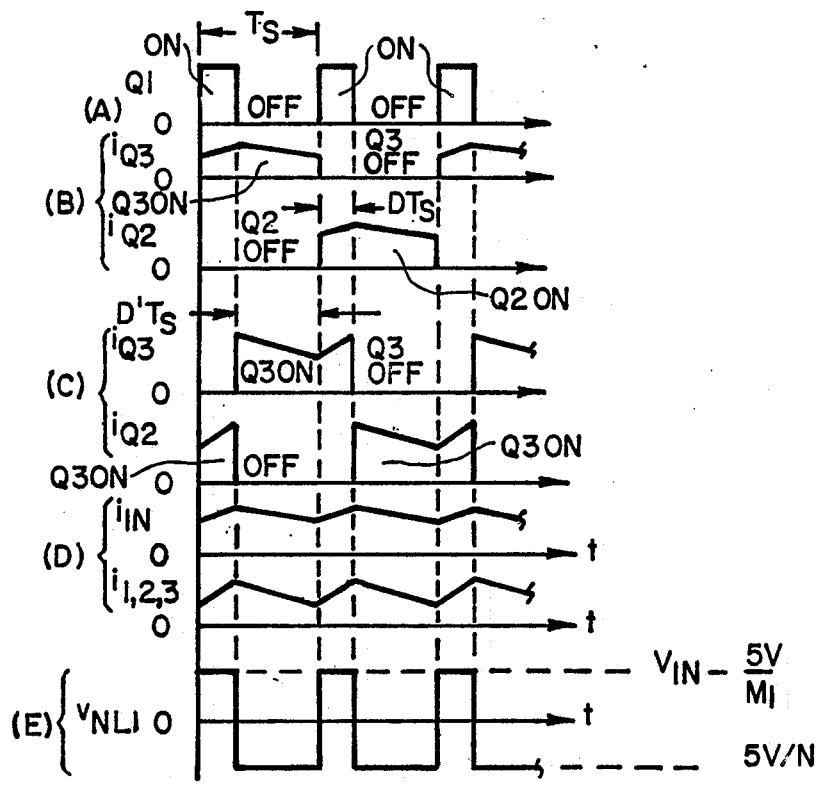
FIG. 16 is a diagram illustrating the current and voltage waveforms within the circuits of FIGS. 8 and 14, wherein Q2 and Q3 are synchronized differently relative to the operation of Q1.

From the foregoing description, it will be observed that numerous variations and modifications may be affected without departing from the true spirit and scope of the novel concept of the invention. For example, FIG. 13 shows another integrated-magnetic version of the circuit shown in FIG. 8, wherein two winding bobbins are used (−12 V output not shown). Further details regarding two-bobbin and three-bobbin cores for integrated-magnetic converters are disclosed in U.S. Pat. No. 4,853,668 to Bloom, "INTEGRATED MAGNETICS CONVERTER CORE" filed on Dec. 23, 1987, under Ser. No. 137 548. Finally, it should be appreciated that Q2 and Q3 may be synchronized in various ways relative to the turn-on and turn-off of Q1. Two ways are illustrated in FIG. 16, parts (B) and (C). It is, of course, intended to cover by the appended claims all such modifications as fall within the scope of the claims.

I claim:

1. A converter circuit, comprising:
   (a) capacitor means having one end joined at a first node to an input lead and having its other end joined at a second node to one end of first inductor means;
   (b) tapped inductor means having one tapped lead which is joined to said other end of said first inductor means, having one end joined to an input reference lead and having its other end joined to an output reference lead;
   (c) switch means for alternately connecting an output lead to said first node and to said second node; and
   (d) operating means for operating said switch means to connect said output lead to said first node for a time period "T1" and to connect said output lead to said second node for a time period "T2", so that for input DC voltage of "V" an output DC voltage is produced that is a function of the product "VD", where "D" is equal to T1/(T1+T2).

2. A converter circuit, comprising:
   (a) first inductor means having one end joined to an input lead and having a core therein;
   (b) capacitor means having one end joined at a first node to the other end of said first inductor means;
   (c) second inductor means, sharing said core, having one end joined at a second node to the other end of said capacitor means and having its other end joined to a ground reference;
   (d) switch means for alternately connecting an output lead to said first node and to said second node; and
   (e) operating means for operating said switch means to connect said output lead to said first node for a time period "T1" and to connect said output lead to said second node for a time period "T2", so that an output DC voltage is produced which is a function of the product "VD", where "D" is equal to T1/(T1+T2) and "V" is an input DC voltage.

3. A converter system, comprising:
   (a) means for applying a DC input voltage across a series combination of first inductor means, capacitor means and second inductor means, said first inductor means and said second inductor means sharing the same core and being tightly coupled to each other, said first inductor means at one end of said capacitor means having the same polarity as said second inductor means at the other end of said capacitor means;
   (b) solid-state switch means "Q1", operating between an "off" state and an "on" state, for connecting an output lead between said first inductor means and said capacitor means when said switch means is in its "on" state;
   (c) diode means for connecting said output lead between said capacitor means and said second inductor means when said switch means is in said "off" state;
   (d) DC/DC converter means comprising transformer means having a split primary winding with said output lead joined to the center of said split primary winding, and comprising two switches "Q2" and "Q3" which are operated alternately, one of said two switches being connected to one end of said primary winding and the other of said two switches joined to the other end of said primary winding, said transformer means sharing the same core as said first inductor means and said second inductor means; and
   (e) operating means for: (1) operating said solid-state switch means in said "on" state for a time period "T1" and in said "off" state for a time period "T2", so that for an input DC voltage of "V" an output DC voltage proportional to "VD" is produced at said output lead, where "D" is equal to T1/(T1+T2) and "VD" is the product of "V" and "D"; and (2) alternately operating said two switches of said DC/DC converter at a duty cycle which is in a fixed relationship to the magnitude of "D".

4. The converter system of claim 3, wherein said operating means operates said solid-state switch "Q1" and said two switches "Q2" and "Q3" through four states characterized by:

| STATE | Q1 | Q2 | Q3 |
|---|---|---|---|
| I | ON | OFF | ON |
| II | OFF | OFF | ON |
| III | ON | ON | OFF |
| IV | OFF | ON | OFF |

5. A converter system, comprising:
   (a) pre-regulator means for producing an essentially zero-ripple output signal at an output lead from a HVDC input voltage "V", said pre-regulator means comprising:

a series circuit of first inductor means, capacitor means and second inductor means, said first inductor means being joined to one end of said capacitor means at a first node and said second inductor means being joined to the other end of said capacitor means at a second node, said first inductor means and said second inductor means having the same core and said series circuit being in parallel with said HVDC input voltage, solid-state switch means, having an "off" state and an "on" state, for connecting said first node to said output lead when in said "on" state; and diode means for connecting said second node to said output lead when said solid-state switch is in said "off" state;

(b) DC/DC regulator means comprising:

a primary transformer winding which is wrapped around said core and which has a center tap and two end leads, said output lead of said pre-regulator being connected to said center tap, and two solid-state switches for connecting said two end leads of said primary winding to a ground reference;

(c) control means for operating said solid-state switch means of said pre-regulator in said "on" state for a time period "T1" and in said "off" state for a time period "T2", said solid-state switch means having a duty cycle "D" of T1/(T1+T2) and said output lead having an output that is a function of the product of "V" and "D"; and (d) driver means, operating in response to said control means, for alternately operating said two solid-state switches of said DC/DC converter in a duty cycle "fD", where "f" is a positive number that is less than one and "fD" is the product of "f" and "D".

6. The converter system of claim 6, where "f" is approximately 0.5.

7. The converter system of claim 5, wherein said DC/DC regulator comprises a tapped secondary transformer winding which is wrapped around said core.

8. The converter system of claim 7, wherein said core has an inner leg and two outer legs, one outer leg carrying said first inductor means and said second inductor means and the other outer leg carrying said primary transformer winding and said secondary transformer winding.

9. The converter system of claim 5, wherein said core has an inner leg and two outer legs and said primary winding comprises a plurality of turns;

wherein those turns of said primary transformer winding between said center tap and one end lead are carried by one outer leg and those turns of said primary transformer winding between said center tap and the other end lead are carried by the other outer leg; and wherein said first inductor means and said second inductor means are carried by said inner leg.

10. The converter system of claim 5, wherein said control means produces an alternating PWM control signal output; and wherein said driver means comprises:

(a) transformer means, connected to receive said control signal output, for producing across a secondary winding a signal which is a function of said PWM control signal output; and (b) R-S latch means having an R-input and an S-input which are connected across said secondary winding and a Q-output for operating one solid-state switch and a Q'-output for operating the other solid-state switch.

11. A converter system, comprising:

(a) a series circuit for receiving a HVDC input voltage, said series circuit comprising first inductor means joined to one end of capacitor means at a first node and said second inductor means joined to the other end of said capacitor means at a second node, (b) first switch means, having an "off" state and an "on" state, for connecting said first node to an output lead when in said "on" state:

(c) diode means for connecting said second node to said output lead when said switch means is in said "off" state;

(d) a primary transformer winding having a center tap and two end leads, said output lead being connected to said center tap;

(e) a secondary transformer winding;

(f) a core for carrying said first inductor means, said second inductor means, said primary transformer winding and said secondary transformer winding;

(g) second switch means for alternately connecting said two end leads of said primary transformer winding to a ground reference;

(h) control means for operating said first switch means through a duty cycle "D"; and (i) driver means, operating in response to said control means, for operating said second switch means in a duty cycle "fD", where "f" is a positive number that is less than one and "fD" is the product of "f" and "D".

12. The converter of claim 11, wherein said control means comprises a control transformer having a primary winding which is connected to the output of a pulse width modulated control system, having one secondary winding which is used to operate said first switch means and having another secondary winding which is used to operate said driver means.

13. The converter of claim 12, wherein said second switch means comprises two FET's and an RS-latch having inputs from said another secondary winding and having one output which is connected to gate one FET and another output which is connected to gate the other FET, said FET's joining said two end leads to said ground reference when gated by said RS-latch.

* * * * *